E. S. BATTERSON.
MAP.
APPLICATION FILED AUG. 13, 1913.
1,089,741.
Patented Mar. 10, 1914.
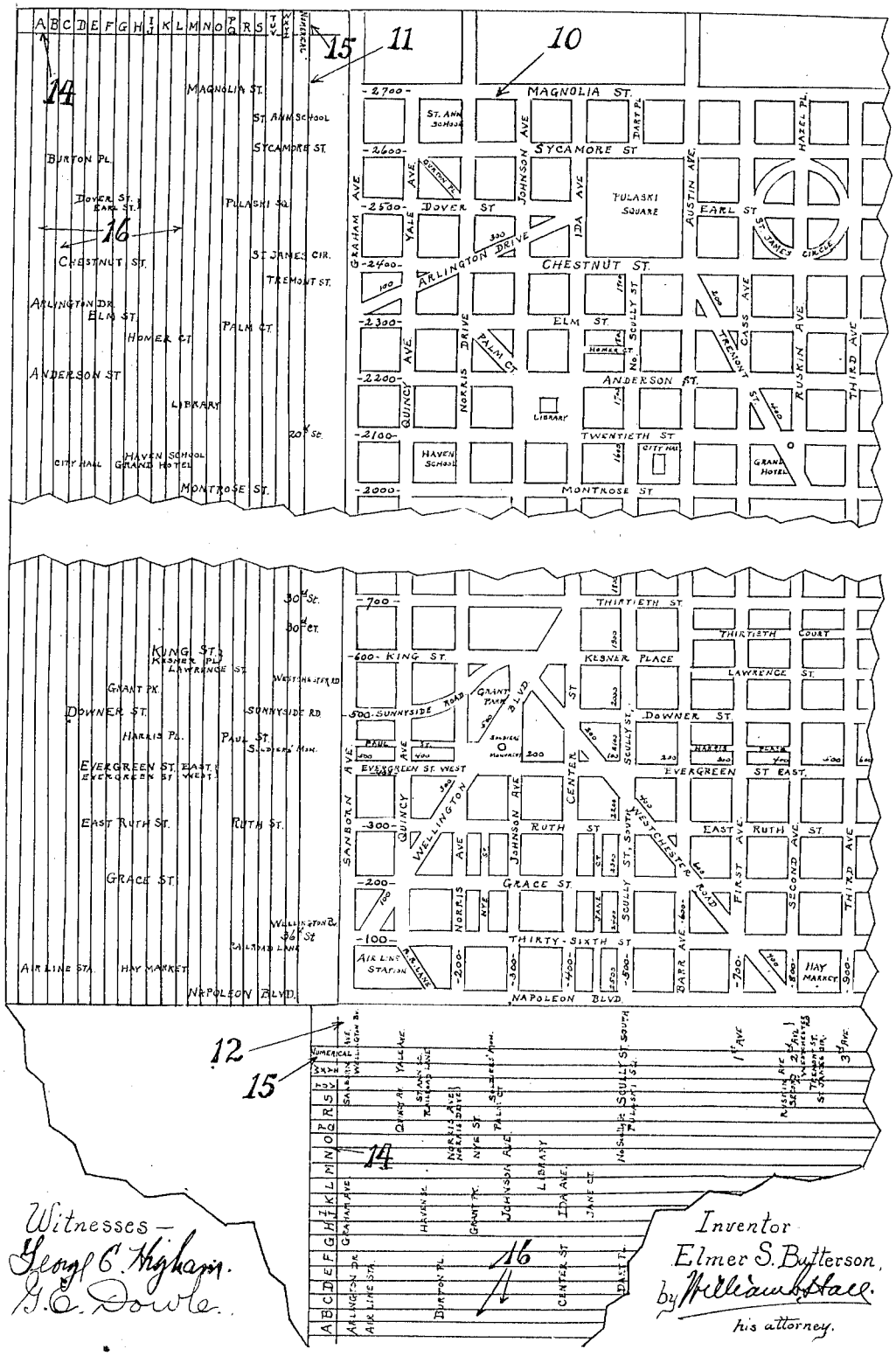

UNITED STATES PATENT OFFICE.

ELMER S. BATTERSON, OF CHICAGO, ILLINOIS.

MAP.

1,089,741.

Specification of Letters Patent.

Patented Mar. 10, 1914.

Application filed August 13, 1913. Serial No. 784,498.

*To all whom it may concern:*

Be it known that I, ELMER S. BATTERSON, a citizen of the United States, and a resident of Chicago, in the county of Cook and State of Illinois, have invented certain new and useful Improvements in Maps; and I do hereby declare that the following is a full, clear, and exact description thereof, reference being had to the accompanying drawings, and to the characters of reference marked thereon, which form a part of this specification.

This invention relates to a novel map and refers more particularly to what may be termed a self indexing map, so arranged as to facilitate the finding of a given street, road or other particular location or point on the map.

Heretofore it has been a common practice to provide maps with crossed lines on the face thereof, and to apply symbols at the ends of the lines, at the margins of the map, the same to be used in connection with a supplemental index, sometimes found on the margin or back of the map sheet, and sometimes printed in a separate index book. In such an arrangement the names of the different streets, roads and points in the map to be located are accompanied in the index by the arbitrary cross line symbols, so that after learning the symbols associated with the name of a given point or place to be located, the lines to which the symbols are appropriated are traced inwardly to their intersection, which will be at or near the point to be located.

A map embodying my present invention is provided on the map face of the sheet either at the margin thereof or superimposed on the map itself, preferably near the margin, with a group or groups of symbols which are in some known manner descriptive or suggestive of the streets delineated on the map or other points of interest to be located, the symbols being so grouped relatively to the streets, roadways or other points to be located thereby that the names of said streets or points may be arranged in line with their proper descriptive or suggestive symbols and also in line with the streets or points to be located, so that thereby the location of the street, roadway or other point may be readily traced from their proper identifying or indexing symbols. If the intersection of two streets, roadways or the like is to be located, the symbol suggesting the name of one of the streets, roadways or the like at one margin of the map is the starting point to trace the name of the latter and a symbol similarly suggestive of the intersecting street, roadway or the like at the other margin of the map is the starting point for locating such other street, roadway or the like, and when the two streets or the like are thus found, their intersection may be readily traced. For instance, when applied to a city or like map, for all the streets bearing names beginning with the letters of the alphabet, the group of indexing symbols may be the letters of the alphabet. If certain other streets are designated by numerals, as 1st, 2nd, 3rd, etc., the indexing group of symbols may bear a column appropriated to numerals. In like manner, the group may bear a column or columns appropriated to a set of streets which are designated by the species of a generic classification as, for instance, "tree" streets, "State" streets, etc.

To facilitate the tracing of a street or roadway from an indexing symbol I may columnate the indexing margin or area, and place one or more symbols at the head or end of each column, and arrange all streets or other names so that the first letter thereof is in a column which bears the same letter at the head or end thereof. When locating intersecting streets bearing names beginning with letters of the alphabet, each street is located in the index by starting with the letter of the alphabet with which such name begins and following the column appropriated to said letter until the street names are found at the map margin, and thereafter tracing the streets inwardly on the map until the intersection is located.

The single figure of the drawing shows a specimen map illustrating the several features of a typical city map to which the invention is applied; and in the following description specific reference is made thereto. It will be understood, however, that the same principle is applicable to any other graphically delineated area.

A fragmentary portion of the map is shown, sufficient only to indicate that at one side of the map proper 10 there is provided a marginal portion 11 and at the adjacent side thereof there is provided a marginal portion 12. It may be assumed that the marginal portion 11 is located at one side of the map and that the marginal portion 12 is located at the bottom or top margin of the map. This arrangement is optional, inasmuch as the indexing areas included by the said marginal portions may be printed or otherwise superimposed directly on the face of the map at any two adjacent marginal portions thereof. At one end or other suitable part of each marginal portion 11 and 12 is a group 14 of indexing symbols. The symbols are herein shown as consisting principally of the letters of the alphabet. Where a city has a number of streets indicated by numerals, an additional column 15, headed by the word "Numerals" may be used. Each of the symbols of each group may be and is preferably arranged at the head or end of a column 16, with the columns of each group arranged parallel to each other and extending throughout the length or width of the map, as the case may be, and each in transverse relation to the streets that terminate at or are directed toward the margin of the map adjacent to said group of columns. The names of all streets that run in the same general direction will, therefore, be found in the columnated marginal portion or area which extends at an angle to said streets, while the names of the streets which run in the other general direction will be found on the marginal portion arranged at an angle to the latter streets. In the case of diagonal streets where doubt may exist as to the general direction, the street name may be listed in both marginal areas. The names of the streets or places in the marginal portions or areas are so arranged that the initial letters thereof are found in columns headed by such initial letters of said names. For instance in the present map, if Chestnut street is to be located, the column appropriated to the letter "C" of one of the groups of columns is traced from the letter "C" at the head of the column until the name Chestnut is reached, which name will be found opposite to Chestnut street in the body of the map, thereby locating the street. If it be desired to locate the intersection of Chestnut street and Johnson avenue, the column bearing the indexing letter "J" is traced until the name Johnson is reached, which name will be found opposite Johnson street in the body of the map, and by tracing this street to the previously located Chestnut street, the intersection of the said streets will be found.

Where diagonal streets occur, the names thereof will usually be found in the marginal space nearest adjacent to the margin of the body of the map where said diagonal streets terminate or nearest approach the margin of the map. An example of this will be found in the side group of street names as applied to Arlington avenue, Palm Court, Tremont street, etc., or as found in the bottom marginal portion as applied to Wellington Boulevard, West Chester Road and Railroad Lane.

Public squares, circles, parks and public buildings, may be located from either margin of the map, as for instance, Pulaski Square, St. James Circle, Grant Park, City Hall, etc. In the case of such points of interest it will be convenient, and will facilitate the location thereof, to include the names of the places in both marginal indexing portions.

From the foregoing it will be obvious that any street of a city may be quickly located regardless of whether the person seeking the information has been previously acquainted with the location thereof, or even the name of the street or place to be located.

In many instances it occurs that a continuous street bears different names in different parts of the city. This situation may be readily taken care of by placing in the appropriate indexing columns opposite such continuous street all of the names which the continuous street bears. This is illustrated in the case of Dover street and Earl street, found in the side marginal columns, and Austin avenue and Barr avenue at the bottom marginal indexing columns. Likewise, public buildings located in line with each other may be thus indexed as, for instance, City Hall, Grant Hotel, and Haven School, found in the northern area of the map and indexed in the side marginal indexing columns.

From the foregoing it will be evident that my indexing plan or arrangement may be applied to meet any situation or contingency found in a street or other map, and it will be apparent that the indexing principle described may be equally well applied to all maps where it is desired to find any definite location within a graphically delineated area.

When reference is made to marginal areas or portions in designating the columnated or otherwise arranged indexing portions of the map, it will be understood that the term marginal is not limited to an area located wholly outside the map body proper, but may be interpreted to mean that such area is either the margin of the map proper, or superimposed upon the map face.

I claim as my invention:—

1. A self indexing map applicable to any graphically delineated area provided on its map face and at adjacent marginal portions with columns to which are appropriated symbols suggestive of the names of the points or places to be located within the area, such names being entered at the columnated portions in line with such locations and with the appropriate column symbols.

2. A self indexing map applicable to any graphically delineated area provided on its map face and at adjacent marginal portions with columns, each column designated by a letter of the alphabet, the names of the streets, roadways or the like to be located within said area being entered in the columnated portion in line with such locations and with the initial letter of each name in a column to which such letter is appropriated as an indexing symbol.

3. A self indexing map provided on its map face with columns bearing symbols suggestive of names of streets, roads and other points on the map which are to be located, the names of the streets and other points to be located being arranged at the columns in prearranged relation to the said streets and other points and also to said symbols of said columns.

4. A self indexing map of city streets and the like provided on its map face with areas divided into columns, and letters appropriated to said columns, the street names being entered on the columnated areas in line with the streets designated thereby, and with the initial letters of said names in the columns to which said initial letters are appropriated as indexing symbols.

In testimony, that I claim the foregoing as my invention I affix my signature in the presence of two witnesses, this 6th day of August, A. D. 1913.

ELMER S. BATTERSON.

Witnesses:
W. L. HALL,
G. E. DOWLE.

---

Copies of this patent may be obtained for five cents each, by addressing the "Commissioner of Patents, Washington, D. C."